United States Patent
Farmer et al.

(10) Patent No.: US 8,238,863 B2
(45) Date of Patent: Aug. 7, 2012

(54) METHODS AND APPARATUSES FOR IDENTIFYING AND MITIGATING INTERFERENCE IN A WIRELESS SIGNAL

(75) Inventors: Dominic Gerard Farmer, Los Gatos, CA (US); Emilija M. Simic, La Jolla, CA (US); Shiou-Hung Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/635,602

(22) Filed: Dec. 10, 2009

(65) Prior Publication Data
US 2011/0142100 A1 Jun. 16, 2011

(51) Int. Cl.
*H04B 1/00* (2006.01)
(52) U.S. Cl. ............. 455/296; 455/570; 455/226.3; 455/278.1; 455/63.1
(58) Field of Classification Search ........... 455/63.1, 455/63.13, 63.14, 114.2, 135, 226.3, 278.1, 455/296, 570
See application file for complete search history.

(56) References Cited

U.S. PATENT DOCUMENTS

| | | | |
|---|---|---|---|
| 7,292,830 B1 * | 11/2007 | Cheung et al. | 455/136 |
| 2002/0130811 A1 * | 9/2002 | Voigtlaender et al. | 342/159 |
| 2007/0153878 A1 | 7/2007 | Filipovic | |
| 2007/0296590 A1 * | 12/2007 | Diorio et al. | 340/572.2 |
| 2008/0143580 A1 | 6/2008 | Glazko et al. | |
| 2008/0146184 A1 | 6/2008 | Dessert | |
| 2008/0160916 A1 | 7/2008 | Jagger et al. | |
| 2009/0190633 A1 | 7/2009 | Smith | |
| 2010/0197235 A1 * | 8/2010 | Wilhelmsson | 455/63.3 |

OTHER PUBLICATIONS

International Search Report and Written Opinion—PCT/US2010/059575, International Search Authority—European Patent Office—Feb. 28, 2011.

* cited by examiner

*Primary Examiner* — Tuan Pham
(74) *Attorney, Agent, or Firm* — Linda G. Gunderson

(57) ABSTRACT

Methods and apparatuses are provided that may be implemented in various electronic devices and/or circuits to identify and mitigate to some extent various known and unknown interference signals that may appear in a received signal.

41 Claims, 4 Drawing Sheets

METHODS AND APPARATUSES FOR IDENTIFYING AND MITIGATING INTERFERENCE IN A WIRELESS SIGNAL

BACKGROUND

1. Field

The subject matter disclosed herein relates to electronic devices, and more particularly to methods and apparatuses for use in a wireless signal receiver and/or with a device capable of receiving a wireless signal.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS), regional navigation systems, and/or other augmented navigation systems. SPS enabled devices, for example, may receive wireless SPS signals that are transmitted by orbiting satellites of a GNSS and/or other ground based transmitting devices. The received SPS signals may, for example, be processed to determine a global time, a range or pseudorange, an approximate or accurate geographical location, altitude, and/or speed of the SPS enabled device. Consequently, various position and/or velocity estimation processes may be supported, at least in part, using an SPS enabled device.

In SPS receivers and like enabled devices, it may be useful to employ techniques that tend to mitigate other possible electromagnetic emanations (signals) that may be received along with one or more desired SPS signals. Such other signals may emanate from various sources (e.g., circuits, devices, etc.) intentionally or unintentionally. Regardless of their origin, such "interference signals" are not usually desired as they tend to interfere in some way with the desired signals, which may impact the operation of the receiver.

Techniques are known for mitigating interference signals that may originate within a receiver and/or device. Here, for example, such interference signals may be identified by testing a given circuit/device as designed or during design. Having identified the potential for a "known" interference signal, design and/or operative techniques may be employed to mitigate the known interference signal in some manner. By way of example, a filter circuit and/or other like function may be employed to attenuate and/or otherwise affect a known interference signal that may appear in a received signal which may also include one or more SPS signals.

It may also be useful to employ techniques in a receiver or like device to effectively identify and mitigate to some extent various unknown interference signals that may appear in a received signal.

SUMMARY

In accordance with certain aspects, techniques are provided herein which may be implemented through various methods and apparatuses to identify and mitigate to some extent various known and unknown interference signals that may appear in a received signal.

For example, in an example implementation a method may be employed in an electronic device having a receiver that is enabled to perform a Fourier transform operation with a received signal. The method may include performing a calibration by measuring a noise power level for at least a portion of a defined signal band and identifying a noise threshold value based, at least in part, on the noise power level. The method may include identifying at least one interference signal within the defined signal band based, at least in part, on one or more electronic signals representing results from the Fourier transform operation, and the identified noise threshold value. The method may include selectively generating one or more electronic signals to initiate operation of at least one programmable signal filter within the receiver to mitigate at least a portion of the interference signal. The method may include selectively generating one or more electronic signals to initiate operation of at least one other programmable signal filter within the receiver to mitigate a predetermined interference signal that is or may be transmitted by at least one circuit within the electronic device.

In certain example implementations, a method may include identifying at least one interference signal by monitoring at least a portion of the defined signal band in response to a change in an operational mode and/or other like operational aspect of the receiver.

In certain example implementations, an electronic device may further include a wireless transceiver and/or other like circuitry and a method may include identifying at least one interference signal by monitoring at least a portion of the defined signal band in response to a change in an operational mode of the wireless transceiver and/or other like circuitry.

In certain example implementations, a method may include periodically performing a calibration and/or selectively performing a calibration in response to one or more triggering events.

In certain example implementations, a method may include identifying the at least one interference signal further by measuring a power level of an electromagnetic signal received within the defined signal band, and identifying the electromagnetic signal as the interference signal if the power level is greater than a noise threshold value.

In certain example implementations, an apparatus may be provided which includes a receiver having an RF front-end circuit to receive electromagnetic signals within a defined signal band and generate at least one corresponding received signal, and a back-end processor circuit coupled to the RF front-end circuit. The back-end processor may, for example, perform a calibration, at least in part, by measuring a noise power level for at least a portion of the defined signal band and identifying a noise threshold value based, at least in part, on the noise power level. The back-end processor may, for example, perform a Fourier transform operation with the received signal. The back-end processor may, for example, identify at least one interference signal within the defined signal band based, at least in part, on one or more results from the Fourier transform operation and the noise threshold value, and selectively initiate operation of at least one programmable signal filter to mitigate at least a portion of the interference signal. The back-end processor may, for example, further selectively initiate operation of at least one other programmable signal filter to mitigate a predetermined interference signal, wherein the predetermined interference signal is or may be transmitted by at least one circuit within the apparatus.

In certain example implementations, the back-end processor circuit may monitor at least a portion of the received signal in response to a change in an operational mode of the receiver. In certain example implementations, the apparatus may include a wireless transceiver, and the back-end processor circuit may monitor at least a portion of the received signal in response to a change in an operational mode of the wireless transceiver.

In certain example implementations, an article of manufacture may be provided which includes a computer readable medium having computer implementable instructions stored thereon that in response to being executed by one or more processing units in an electronic device enable the electronic device to perform a calibration, identify at least one interference signal within the defined signal band based, at least in part, on one or more results from a Fourier transform operation and a noise threshold value, selectively initiate operation of at least one programmable signal filter to mitigate at least a portion of the interference signal, and selectively initiate operation of at least one other programmable signal filter to mitigate a predetermined interference signal that is or may be transmitted at least in part by at least one circuit within the electronic device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
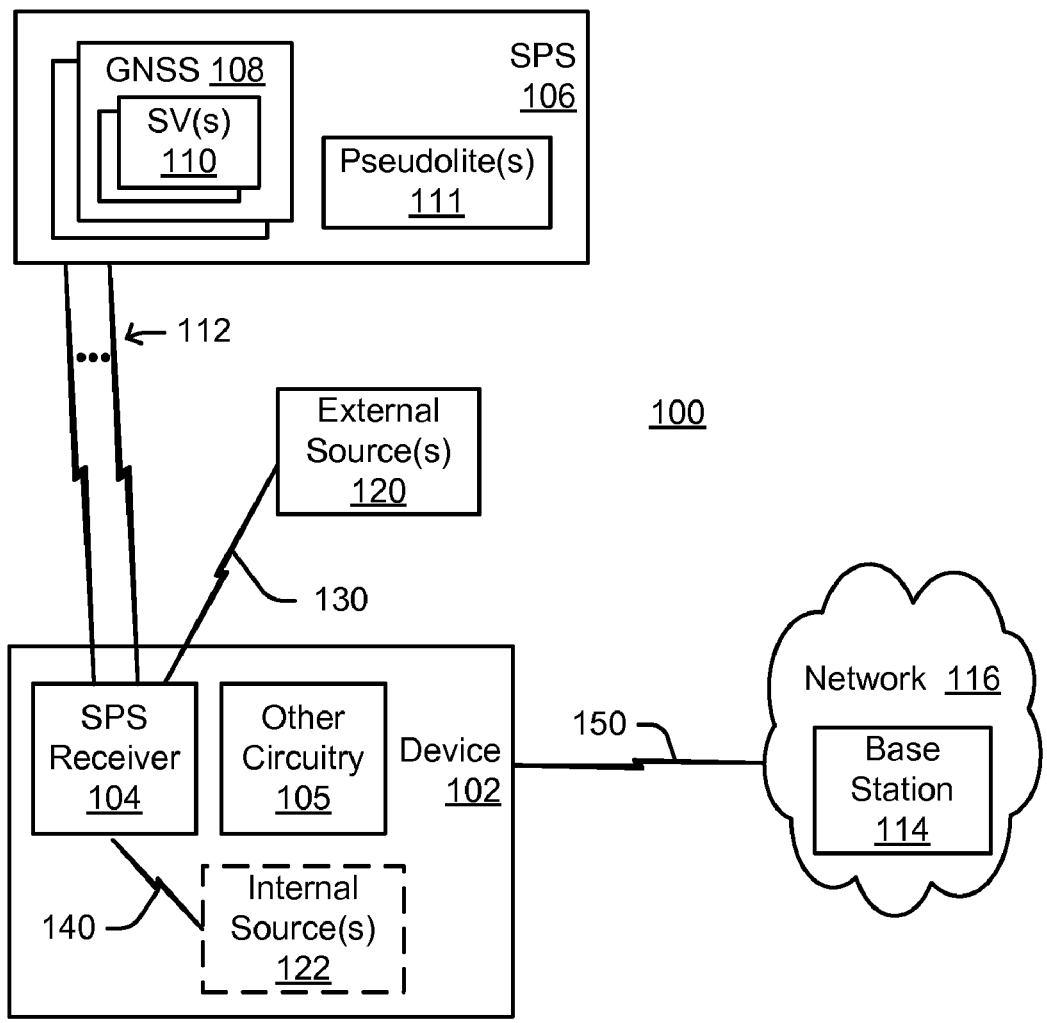
FIG. 1 is a schematic block diagram illustrating an exemplary signaling environment that includes at least one electronic device to receive one or more electromagnetic signals and establish at least one corresponding received signal that may include one or more desired signals and possibly one or more interference signals, in accordance with an implementation.

Example methods and apparatuses are provided that may be implemented in various electronic devices and/or circuits to identify and mitigate to some extent various known and/or unknown interference signals that may appear in a received signal that may also include one or more navigation related signals and/or other like wireless signals. Such methods and apparatuses may, for example, be implemented to provide dynamic real-time interference signal identification and mitigation. Such methods and apparatuses may, for example, be implemented to perform applicable spectrum monitoring to detect known and/or unknown interference signals, and dynamically assign and/or otherwise operatively apply signal filtering directed towards mitigating certain identified interference signals.

By way of example but not limitation, techniques are provided herein which may be implemented in an SPS receiver and/or SPS receiver enabled electronic device that may receive one or more electromagnetic signals within a defined signal band and establish at least one or more electronic signals representing a corresponding "received signal". The received signal may include one or more SPS signals and possibly one or more interference signals. Those skilled in the art will recognize that such techniques may be employed in other wireless receivers and/or devices, such as, e.g., receivers and/or other like electronic devices of a communication system.

An SPS receiver or other like receiver/device may compute a discrete Fourier transform (DFT) using a "Fourier transform operation" (e.g., employing a fast Fourier transform (FFT) algorithm and/or the like) with a received signal and the results of the Fourier transform operation may be processed to identify at least one interference signal. For example, Fourier transform operation results for a received signal may be compared to one or more threshold values, such as, e.g., a noise threshold value that may be established during an earlier calibration process.

In response to identifying an interference signal within the received signals, at least one programmable signal filter, for example within the SPS receiver, may be operatively assigned and/or otherwise programmed to mitigate at least a portion of the identified interference signal portion of the received signal.

In certain example implementations, techniques provided herein may be selectively performed, for example, to reduce use of shared processing and/or memory resources, and/or power usage. For example, certain processes and/of functions may be enabled to operate at certain times and/or in response to certain events. Thus, certain processes and/of functions may be enabled to operate periodically based, at least in part, on some function of time. By way of non-limiting example, an interference detector process may be enabled to periodically (and/or at other specified times) evaluate Fourier transform operation results to of check for potential interference signals.

In certain example implementations, processes and/of functions may be enabled to operate based, at least in part, in response to the occurrence of one or more selected events. By way of non-limiting example, an interference detector process may be enabled to monitor at least a portion of the defined signal band in response to a change in an operational mode of an SPS receiver. For example, an SPS receiver may change operational modes during a "power up" or other like process, and/to to receive different SPS signals, e.g., on different bands, from different selected GNSS, regional satellite system, and/or space vehicles (SVs), etc.

In certain example implementations, an SPS receiver enabled electronic device may comprise other circuitry that may generate a selected event to which an interference detector process may respond in some manner. By way of non-limiting example, an SPS receiver enabled electronic device may comprise a wireless transceiver for use with a wireless communication network. Thus, for example, an interference detector process may be enabled to monitor at least a portion of the defined signal band in response to a change in an operational mode of a wireless transceiver. For example, a wireless transceiver may change operational modes during a "power up" or other like process, to receive and/or transmit signals over different links, channels, bands, frequencies, etc.

In certain example implementations, methods and apparatuses provided herein may selectively perform a calibration process to account for changing wireless environments. For example, a calibration process may be performed at certain times and/or on the occurrence of certain events. For example, during a power up or other like process, a calibration process may be performed to measure a noise power level for at least a portion of a defined signal band, and to identify at least one noise threshold value based, at least in part, on the noise power level. As such, the methods and apparatuses provided herein may be implemented to similarly measure a power level of an electromagnetic signal as received within said defined signal band and identify such electromagnetic signal as an interference signal if its power level is greater than a noise threshold value.

In certain example implementations, a plurality of programmable signal filters may be provided and selectively assigned or otherwise programmed to mitigate in some manner interference signals. By way of non-limiting example, one or more notch filters and/or other like functions may be provided. Here, for example, a notch filter may be enabled to operate in a relatively narrow band with a center frequency set to a frequency of an identified interference signal.

In certain example implementations, methods and apparatuses provided herein may also be enabled to initiate operation of a notch filter and/or other like function to mitigate a known (e.g., predetermined) interference signal as may emanate from at least one circuit within an SPS receiver and/or other circuitry in an SPS receiver enabled electronic device. Thus, in certain implementations, both known and unknown interference signals may be mitigated in some manner.

Also as described in greater detail in subsequent sections, as used herein an SPS may include a variety of like or different types of systems, devices, processes, etc., that are capable in providing and/or otherwise supporting in some manner a position/velocity/time estimation process. By way of example but not limitation, in certain example implementations an SPS may include one or more global navigation satellite systems (GNSS), such as, the global positioning system (GPS) having a plurality of SVs, a regional navigation satellite system, and/or one or more ground based transmitters, networks, or devices such as a cellular base station.

Reference is now made to FIG. 1, which is a schematic block diagram illustrating an exemplary signaling environment 100 that includes an SPS enabled electronic device 102 to receive one or more electromagnetic signals and establish at least one corresponding received signal that may include one or more SPS signals 112 and possibly one or more interference signals 130 and/or 140, in accordance with an implementation.

Environment 100 may include various computing and communication resources capable of providing at least some form of a position/velocity/time estimation process with regard to device 102 based, at least in part, on one or more SPS signals 112 from an SPS 106. Device 102 is representative, therefore, of an electronic device that is capable of performing with or without assistance a position/velocity/time estimation process based at least in part on SPS signals. Accordingly, device 102 may include an SPS receiver 104. Thus, for example, device 102 may take the form of a stand-alone navigation circuit or device in certain implementations. In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless/wired communication links 150 coupled to a base station 114 or other like access point. Thus, for example, device 102 may include a mobile station such as a cellular phone, a smart phone, a personal digital assistant, a portable computing device, a navigation unit, and/or the like or any combination thereof. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108 or other like regional navigation satellite systems, each of which may include a different plurality of SVs 110 that may transmit different SPS signals 112. As illustrated, SPS 106 may, for example, include one or more pseudolites 111 and/or other like transmitting devices that may transmit certain SPS signals 112.

Techniques described herein may be used with an "SPS" that includes any one of several GNSS and/or combinations of GNSS. Furthermore, such techniques may be used with positioning systems that utilize ground based transmitters (GBTs) or a combination of SVs and GBTs. GBTs may be useful, for example, to augment an SPS in situations where SPS signals from an orbiting SV might be unavailable, such as in tunnels, mines, buildings, urban canyons or other enclosed areas. Another implementation of GBTs is known as radio-beacons. The term "SV", as used herein, is intended to include GBTs, equivalents of GBTs, and possibly others. The terms "SPS signals" and/or "SV signals", as used herein, is intended to include signals from GBTs or equivalents of GBTs.

As illustrated in the example in FIG. 1, one or more external sources 120 may intentionally or unintentionally emit an interference signal 130 that may be received by SPS receiver 104. External source 120 may be representative of any electronic device, circuit, and/or other like electrically conductive feature from which an electromagnetic signal is emitted and wherein at least a portion of the emitted electromagnetic signal is received by SPS receiver 104 while receiving at least one SPS signal 112.

As illustrated in the example in FIG. 1, one or more internal sources 122 may intentionally or unintentionally emit an interference signal 140 that may be received by and/or otherwise affects reception of SPS receiver 104. External source 120 may be representative of any electronic device, circuit, and/or other like electrically conductive feature from which an electromagnetic signal is emitted and wherein at least a portion of the emitted electromagnetic signal is received by and/or otherwise affects reception of SPS receiver 104 while receiving at least one SPS signal 112. In certain implementations, other circuitry 105 may include one or more such internal sources.

Figure 2:
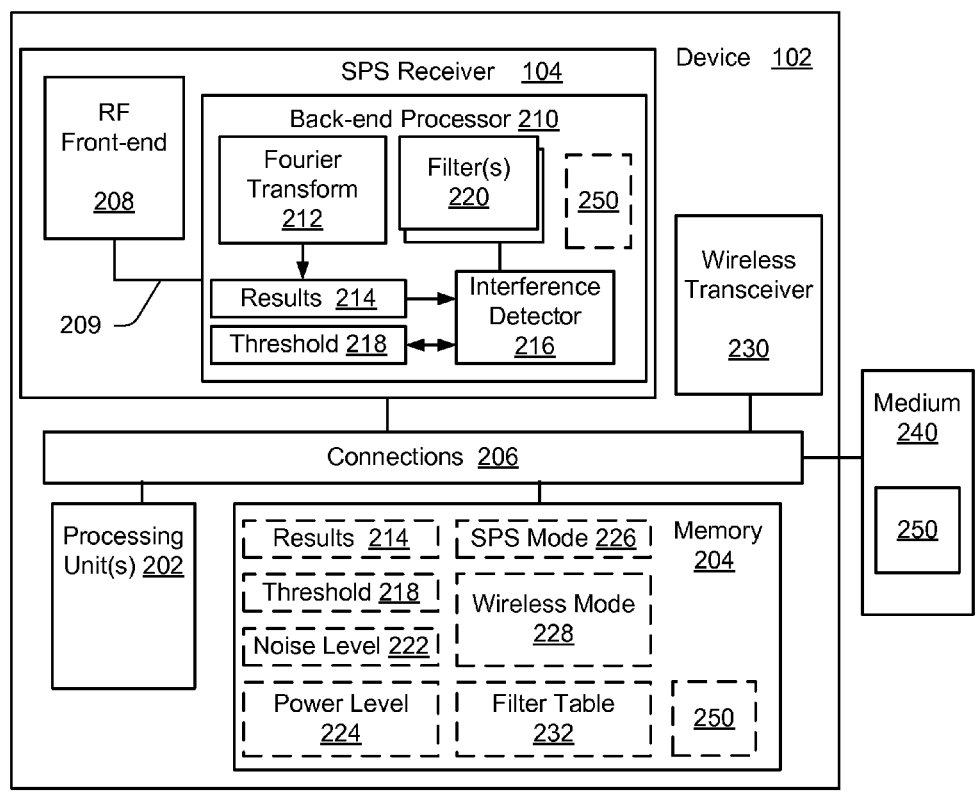
FIG. 2 is a schematic block diagram illustrating certain features of an exemplary electronic device, for example as in FIG. 1, capable of computing a discrete Fourier transform (DFT) on a received signal, and selectively identifying an interference signal and initiating operations to mitigate the interference signal, in accordance with an implementation.

Reference is made next to FIG. 2, which is a schematic block diagram illustrating certain features of an exemplary SPS enabled electronic device 102, for example as in FIG. 1, capable of performing a Fourier transform operation 212 on a received signal 209, and selectively identify an interference signal and initiate operations to mitigate the interference signal, in accordance with an implementation.

In certain example implementations, device 102 may include an SPS receiver 104 capable of receiving an RF signal that includes at least one SPS signal 112 (FIG. 1) and possibly one or more interference signals. SPS receiver 104 may comprise, for example, an RF front-end circuit 208 coupled to a back-end processing unit 210. RF front-end circuit 208 may, for example, provide one or more electronic signals representing a "received signal". In the examples below, it will be assumed that received signal 209 comprises at least one SPS signal and at least one interference signal.

In certain implementations, back-end processing unit 210 may comprise a processing unit and/or other circuitry enabled to perform a Fourier transform operation 212 with at least a portion of received signal 209 from RF front-end circuit 208 to establish one or more corresponding results 214. As illustrated in this example, back-end processing unit 210 may include or otherwise operatively implement, in whole or part, an interference detector process 216. Interference detector process 216 may, for example, be enabled to selectively obtain results 214 based, at least in part, thereon identify an interference signal within received signal 209. In certain examples, interference detector process 216 may selectively establish and/or otherwise obtain one or more thresholds 218. Thus, for example, interference detector process 216 may be enabled to identify an interference signal within received signal 209 based, at least in part on, results 214 and thresholds 218. For example, results 214 may indicate that an interference signal may be present at certain frequencies based, at least in part, on determining that a spur or other like signal feature has a measured power level that exceeds at threshold power level. In certain example implementations, a threshold power level 224 may specify or other be based at least in part on a measured noise level 222 (e.g., as determined during a calibration process).

In response to identifying an interference signal, interference detector process 216 may, for example, assign or otherwise operatively initiate at least one programmable signal filter 220 as applicable to mitigate the interference signal in some manner. For example, in certain implementations, one or more notch filters may be provided which are programmed or otherwise operatively set in some manner to mitigate at least a portion of received signal 209 associated with at least a portion of the interference signal. In certain implementations, a plurality of notch or other like filters may be provided to allow for mitigation of a plurality of identified and/or otherwise predetermined (e.g., known) interference signals within received signal 209.

The result of such mitigation being applied to received signal 209 may include one or more electronic signals representing a filtered version of received signal 209, which may then be further processed within SPS receiver 210, for example, to support various location and/or other like navigation processes. Hence, a filtered version of received signal 209 may allow for improved SPS signal reception and acquisition.

As illustrated in the example implementation of FIG. 2, in certain implementations an SPS receiver 210 may be coupled to one or more processing units 202, memory 204, and a wireless transceiver 230, e.g., through one or more connections 206. Although not shown, all or part of memory 204 may be provided within SPS receiver 104 in certain implementations.

In certain implementations, an article of manufacture represented here by a computer readable medium 240 may be provided and accessed by one or more of the circuits and/or processes in device 102, for example. As such, in certain example implementations, the methods and/or apparatuses may take the form in whole or part of a computer readable medium 220 that may include computer implementable instructions 250 stored thereon, which if executed by at least one processing unit or other like circuitry enable back-end processor 210, processing unit(s) 202, and/or the other circuitry to perform all or portions of techniques as presented herein.

Some of the techniques provided herein may be performed entirely by SPS receiver 104. In other implementations, some of the techniques provided herein may, for example, be preformed by SPS receiver 104 with assistance and/or input from one or more other circuits within device 102. For example, in certain implementations a processing unit 202 and memory 204 may be enabled to support an interference detector process in some manner. By way of a non-limiting example, memory 204 may store information in the form of one or more electronic signals representing one or more results 214, thresholds 218, measured noise levels 222, measured power levels 224, SPS modes 226, wireless transceiver modes 228, and/or filter tables 232. Here, for example, all or portions of such stored information may be obtained from or by SPS receiver 104, processing unit(s) 202, and/or wireless transceiver 230.

A measured noise level 222 may, for example, be determined during a calibration process. Measured noise level 222 may, for example, represent an average and/or other like measure of environment/background electromagnetic noise as provided in at least one received signal 209 over a period of time. In certain implementations, measured noise level 222 may, for example, represent an average and/or other like measure of environment/background electromagnetic noise as provided in at least one filtered version of received signal 209 over a period of time.

A threshold 218 may, for example, be based at least in part on at least one measured noise level 222. Thus, in certain implementations, threshold 218 may be substantially equal to or otherwise matched in some manner with measured noise level 222. In other examples, threshold 218 may be offset from or otherwise set higher in some manner than measured noise level 222. In still other examples, a plurality of thresholds 218 may be provided and/or otherwise determined (e.g., statically or dynamically) to provide different selected levels above the measured noise level 222. Here, for example, it may be useful in an interference detector process 216 to mitigate certain select interference signals if several interference signals are identified and/or otherwise predetermined. Thus, having different threshold level values may help to identify and mitigate the worse offenders which may be those interference signals with greater measured power levels 224. In certain implementations, other characteristics of an interference signal may also or alternatively be considered (e.g., frequency, persistence, etc.) and hence one or more thresholds may be provided for use by interference detector process 216.

SPS modes 226 may, for example, represent or otherwise relate to events that may trigger interference detector process 216 to act or respond in some manner. For example, an SPS mode may indicate that SPS receiver 104 has or will soon change operation in some manner with regard to SPS signal reception. Here, for example, an SPS mode may identify that SPS receiver 104 is to power up or down, sleep, awaken, pause, restart, initiate a deep/shallow search, receive certain SPS signals/bands, etc. In response to one or more such SPS modes, interference detector process 216 may, for example, perform a calibration process, assign or re-assign signal filters 220, select certain thresholds 218, perform Fourier transform operation 212, and/or measure noise and/or other power levels, etc.

Wireless transceiver modes 228 may, for example, represent or otherwise relate to events that may trigger interference detector process 216 to act or respond in some manner. For example, a wireless transceiver mode may indicate that wireless transceiver 230 has or will soon change operation in some manner with regard to wireless signal transmission and/or reception. Here, for example, a wireless transceiver mode may identify that wireless transceiver 230 is to power up or down, sleep, awaken, pause, restart, transmit, receive, use certain channels, links, bands, etc. In response, to one or more such wireless transceiver mode(s) and/or mode transitions, interference detector process 216 may, for example, perform a calibration process, assign or re-assign signal filters 220, select certain thresholds 218, perform Fourier transform operation 212, measure noise and/or other power levels, etc. Here, for example, a wireless transceiver mode may indicate that a (known) predetermined interference signal may be present and hence interference detector process 216 may assign or re-assign signal filters 220 to mitigate such interference signals. In certain implementations, a (known) predetermined interference signal may, for example, be identified based at least in part on information available in one or more filter tables 232 and/or the like within memory 204. In certain example implementations, all or part of the information in a filter table 232 may be predetermined and/or otherwise identified in memory and represent expected/known interference signals that may be associated with the operation of receiver 104 and/or other circuitry in device 102. Thus, a filter table may identify or otherwise be associated with a potential internally generated interference signal to which one or more notch filter(s) and/or the like may be assigned to mitigate. For example, a filter table may identify certain frequencies and/or bands associated with certain communication signals (e.g., CDMA channels, etc.) that may be transmitted and/or received.

In certain implementations, a plurality of signal filters may be selectively assigned in some manner to mitigate certain (known) predetermined interference signals prior to certain (unknown) interference signals. Indeed, in certain example implementations a subset of signal filters may be dedicated for use in mitigating only (known) predetermined interference signals, while the remaining signal filters may be dynamically assigned to mitigate known or unknown interference signals. It is also recognized that in certain implementations, there may be different types of signal filters.

Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from the processing units, it should be understood that all or part of a primary memory may be provided within or otherwise co-located/coupled with processing unit(s) 202, back-end processing unit 210, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 240.

Figure 3:
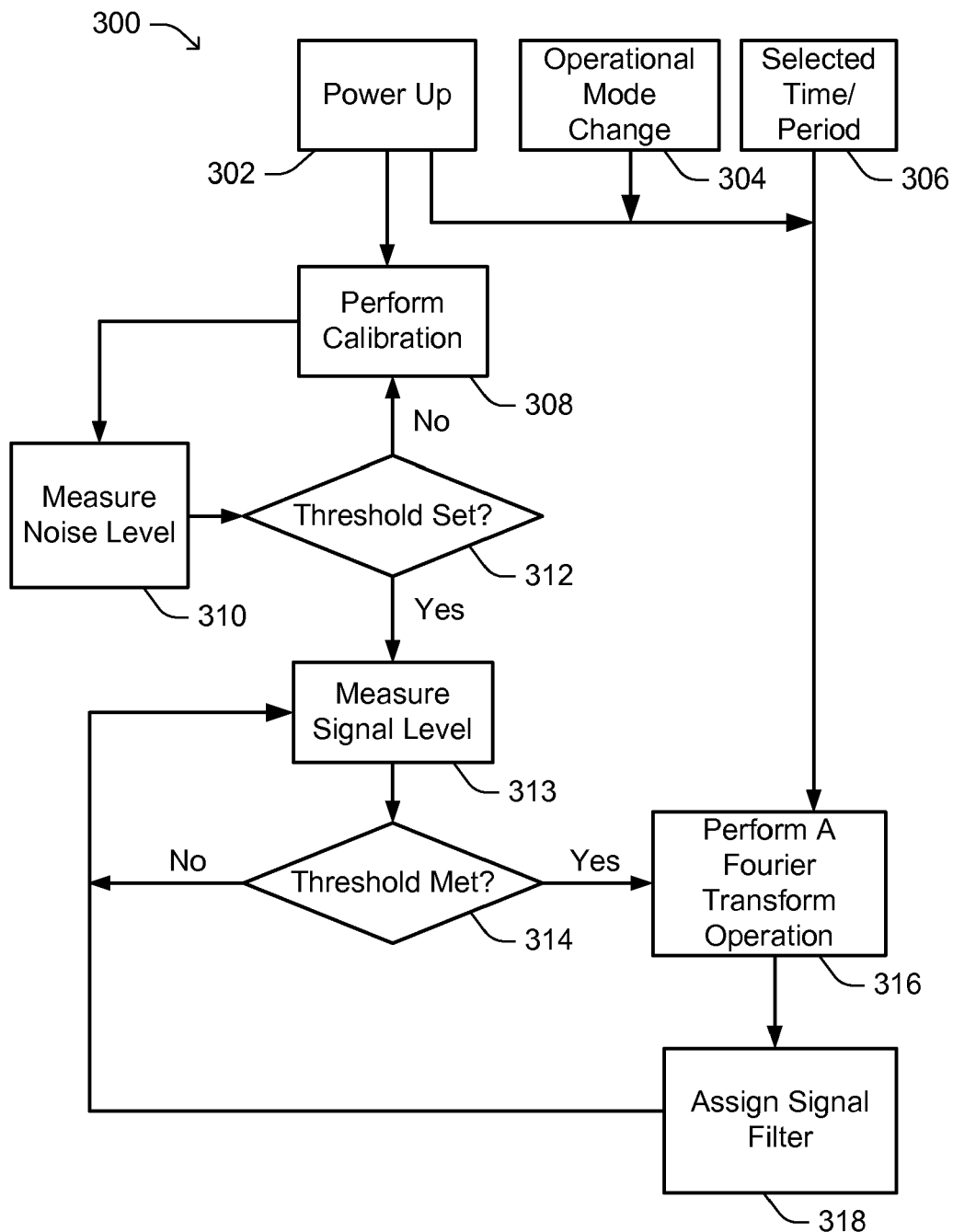
FIG. 3 is a functional flow diagram illustrating certain features of an exemplary interference detector process that may be implemented in a receiver enabled device, for example as in FIG. 1 and/or FIG. 2, in accordance with an implementation.

Reference is made next to FIG. 3, which is a functional flow diagram illustrating certain features of an exemplary interference detector process 300 that may, for example, be implemented in whole or part in SPS receiver 104 (FIG. 1), in accordance with an implementation.

In this example, interference detector process 300 includes three example triggering events blocks that may initiate certain actions. For example, at block 302, a triggering event may include a power up or other like event that may be initiated or detected. Here, SPS receiver 104 may be powering on after being completely or partially powered down or otherwise had some or all of its functions temporarily halted, for example. At block 304, a triggering event may include one or more operational mode changes or the like that may be initiated or detected. Here, for example, SPS receiver 104, wireless transceiver 230, or other circuitry 105 may undergo or expect to undergo an operational change. At block 306, a triggering event may include one or more time-based events (e.g., periodic timer, selected times, etc.). Here, for example, a period of time may be measured such that after a certain number of seconds a triggering event occurs. Of course more complex functions may be used to determine a time-based event.

Assuming that a power up event has occurred, at block 308, a calibration process may be performed. A calibration process may, for example, initiate a particular receiver operation (e.g., select a defined band, etc.). In certain example implementations, a calibration process may comprise a self-calibration operation in which receiver operation is intentionally limited or otherwise affected in someway. At block 310, a noise level may be measured for the received signal, a filtered version of the received signal, or a self-calibration version of the received signal. Here, for example, an average noise level and/or other like measure of receiver sensitivity may be determined over one or more periods of time. In some implementations, for example, a measure of a composite input signal level may be determined using a Baseband Processor Amplitude measurement circuit and/or the like.

At block 312, it may be determined if at least one noise level threshold or other like sensitivity threshold may be set and/or has been set. Here, for example, a noise level threshold may be based, at least in part, on one or more measured noise levels. If a threshold is not set, then process 300 may return to block 308. Once a threshold is set, then process 300 may continue at block 314.

At block 314, it may be determined if at least one measured power level for a suspected interference signal in a received signal at least meets or exceeds a given noise level threshold. Here, for example, while powering up at block 302, process 300 may also continue at block 316, wherein a Fourier transform operation may be performed with a received signal or filtered version of a received signal, and a power level measured based on the Fourier transform operation results. Thus, at block 314, it may be determined if a measured power level from block 313 meets or exceeds a given noise level threshold. If a measured power level meets or exceeds a given noise level threshold, then process 300 may continue with blocks 316 and/or 318. At block 318, one or more signal filters may be assigned or otherwise provided to mitigate interference. For example, one or more notch filters may be assigned to one or more frequencies/bands.

Process 300 may continue at block 313 following block 318 and/or if a given threshold was not satisfied at block 314. In this manner, for example, blocks 313, 312 and 314 may provide an interference detector capability, wherein if determined that a given threshold is at least met or exceeded (e.g., satisfied), blocks 316 and 318 may be employed to further identify an interference signal and assign signal filters, respectively, to provide mitigation for interference. Blocks 316 and 318 may be employed upon other triggering events (e.g., blocks 302, 304, 306) to further identify an interference signal and assign signal filters, respectively, to provide applicable mitigation.

Figure 4:
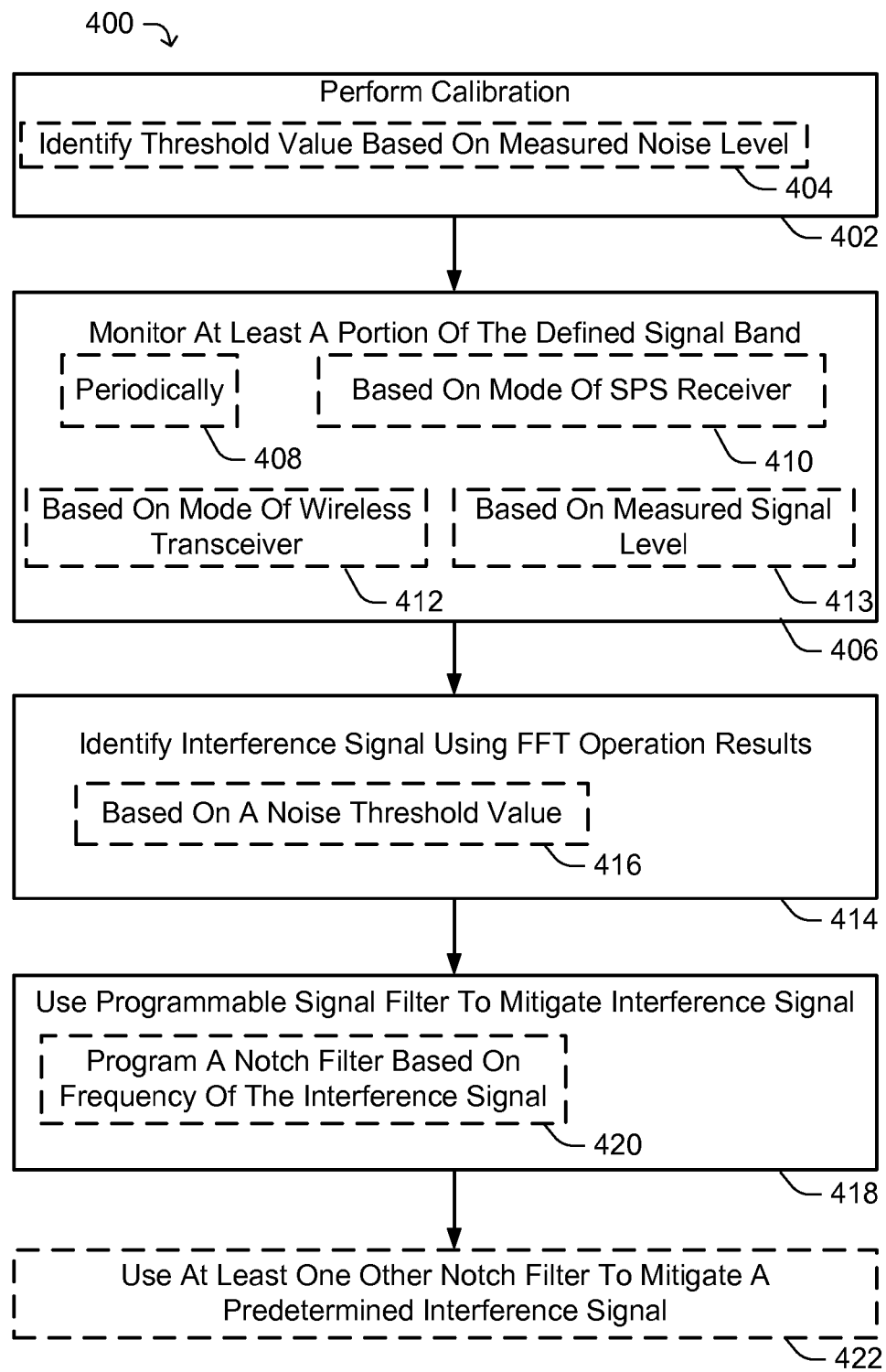
FIG. 4 is a flow diagram illustrating an example process that may be implemented in a receiver enabled device, for example as in FIG. 1 and/or FIG. 2, to identify and mitigate interference signals, in accordance with an implementation.

FIG. 4 is a flow diagram illustrating an example process 400 that may be implemented in an SPS receiver enabled device, for example as in FIG. 1 and/or FIG. 2, to identify and mitigate interference signals, in accordance with an implementation.

At block 402, a calibration may be performed. In certain implementations, at block 404, a threshold value may be identified based, at least in part, on a measured noise level, a measured sensitively level, and/or the like.

At block 406 at least a portion of a defined signal band may be monitored. For example, an interference detection capability may be employed. Such monitoring may be selectively triggered in some manner. For example, at block 408, monitoring may be periodically initiated. For example, at block 410, monitoring may be initiated based on a mode of an SPS receiver. For example, at block 412, monitoring may be initiated based on a mode of a wireless transceiver. For example, at block 413, monitoring may be initiated based on a measured signal level excess threshold.

At block 414, an interference signal may be identified based, at least in part, on the results of a Fourier transform operation. In certain examples, at block 416, interference signal may be identified based, at least in part, on a threshold value. For example, the strength of an interference signal (e.g., a spur, etc.) may be converted into a real power level for comparison to an applicable threshold value (e.g., as defined or otherwise specified by an interference specification, etc.).

At block 418, a programmable signal filter may, for example, be assigned and used to mitigate at least a portion of an interference signal within a received signal. In certain examples, at block 420, a notch filter may be programmed to a frequency of an interference signal.

At block 422, in certain implementations, at least one other signal filter (e.g., notch filter) may be assigned and used to mitigate a predetermined interference signal.

Some internally generated interference signals, which may be referred to as "jammers," may be associated with particular channels or technologies. For example, a particular CDMA, UMTS, or other wireless channel may be associated with a particular set of expected internal jammers (generally these are determined to be the internal jammers exceeding a strength threshold and/or of a particular frequency range). Additionally, particular jammers and/or jammer profiles may be associated with the use of an additional and/or different technology (e.g., activation of Bluetooth technology on a mobile device). Accordingly, changing channels and/or technologies may be a particularly important "triggering event."

In a particular embodiment, a mobile device may perform a calibration process as shown in FIG. 3 and described in the associated description to set one or more thresholds for detection of interference signals. However, if there is a change in the channel and/or technology during the calibration process, it may be advantageous to either stop the calibration process and restart, or to ignore/discard the results and start another calibration process. Additionally, since the results of the calibration or interference detection techniques may be affected by a switch in amplifier gain step (e.g., a step increase for a relatively weak signal or decrease for a relatively strong signal), the calibration process may be stopped and restarted or the results ignored/discarded and the calibration process restarted if this occurs.

Similarly, if there is a triggering event during data collection for the FFT technique outlined above, the process may be stopped and restarted or the results ignored/discarded and data collection restarted. This may avoid incorrect notch filter assignment and the need for reassignment to reduce the effects of interfering signals on operation of the mobile device.

In some implementations, for N available notch filters, at least some of the notch filters can be assigned to expected internal jammers associated with a current channel for the mobile device. Information indicative of the expected internal jammers associated with the current channel can be obtained in many ways; for example, a jammer table that includes jammer information for one or more channels may be stored in a memory of the mobile device. The jammer table may include channel identifier information, and expected internal jammer information associated with the channel identifier information (such as information indicative of jammer frequency, expected strength, etc).

The information about the expected internal jammers can be used in a number of ways. In a first example, if there are M expected internal jammers associated with a particular channel (where M<N), a notch filter can be assigned to each of the M expected jammers, while the remaining N−M notch filters are available for dynamic notch allocation. The FFT techniques outlined above can be used to identify additional interfering signals (generated internally and/or externally), and the remaining N−M notch filters assigned to filter selected ones of the identified additional interfering signals. The selected identified additional interfering signals may be selected based on strength, and/or based on frequency (e.g., signals at a frequency that is more likely to interfere with operation of the mobile device), and/or based on one or more additional/different criteria.

In a second example, a number K<M of the M notch filters may be assigned to a selected subset of the expected internal jammers (e.g., the strongest jammers, the strongest jammers in a frequency range, etc.). The FFT techniques outlined above can be used to assign each of the remaining M−K notch filters to either a non-selected expected internal jammer or an additional identified interfering signal. In certain instances, for example, the filtering selection between expected internal jammers and identified additional interfering signals may be selected based, at least in part, strength, frequency, and/or other like criteria. In certain example implementations, there may be up to N−K notch filters assigned to the identified additional interfering signals.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
    with an electronic device comprising a receiver enabled to perform a Fourier transform operation with a received signal:
        performing a calibration, at least in part, by measuring a noise power level for at least a portion of a defined signal band and identifying a noise threshold value based, at least in part, on said noise power level;
        identifying at least one interference signal within said defined signal band based, at least in part, on one or more electronic signals representing results from said Fourier transform operation and said noise threshold value;
        selectively generating one or more electronic signals to initiate operation of at least one programmable signal filter within said receiver to mitigate at least a portion of said interference signal; and
        selectively generating one or more electronic signals to initiate operation of at least one other programmable signal filter within said receiver to mitigate a predetermined interference signal, said predetermined interference signal being transmitted at least in part by at least one circuit within said electronic device.

2. The method as recited in claim 1, wherein identifying said at least one interference signal further comprises:
    monitoring at least a portion of said defined signal band in response to a change in an operational mode of said receiver.

3. The method as recited in claim 1, wherein said electronic device further comprises a wireless transceiver, and wherein identifying said at least one interference signal further comprises:

monitoring at least a portion of said defined signal band in response to a change in an operational mode of said wireless transceiver.

4. The method as recited in claim 1, further comprising periodically performing said calibration.

5. The method as recited in claim 1, further comprising selectively performing said calibration in response to one or more triggering events.

6. The method as recited in claim 1, wherein identifying said at least one interference signal further comprises:
measuring a power level of an electromagnetic signal received within said defined signal band; and
identifying said electromagnetic signal as said interference signal if said power level is greater than said noise threshold value.

7. The method as recited in claim 1, further comprising:
receiving said interference signal from a transmitting source external to said electronic device.

8. The method as recited in claim 1, wherein said interference signal is generated by said electronic device.

9. The method as recited in claim 1, wherein said at least one programmable signal filter comprises a notch filter.

10. The method as recited in claim 9, further comprising:
programming said notch filter to operate with a center frequency set to a frequency of said interference signal.

11. An apparatus comprising:
means for receiving at least one signal within a defined signal band;
means for performing calibration, at least in part, by measuring a noise power level for at least a portion of said defined signal band and identifying a noise threshold value based, at least in part, on said noise power level;
means for performing a Fourier transform operation using at least one received signal within said defined signal band;
means for identifying at least one interference signal within said defined signal band based, at least in part, on at least one result from said Fourier transform operation;
means for selectively initiating operation of at least one programmable signal filter within said means for receiving said at least one signal to mitigate at least a portion of said interference signal; and
means for selectively initiating operation of at least one other programmable signal filter within said means for receiving said at least one signal to mitigate a predetermined interference signal, said predetermined interference signal being transmitted at least in part by at least one circuit within said electronic device.

12. The apparatus as recited in claim 11, further comprising:
means for monitoring at least a portion of said defined signal band in response to a change in an operational mode of said means for receiving said at least one signal.

13. The apparatus as recited in claim 11, further comprising:
means for coupling to a wireless communication network; and
means for monitoring at least a portion of said defined signal band in response to a change in an operational mode of said means for coupling to said wireless communication network.

14. The apparatus as recited in claim 11, wherein said means for performing calibration periodically performs said calibration.

15. The apparatus as recited in claim 11, wherein said means for performing calibration periodically performs said calibration in response to one or more triggering events.

16. The apparatus as recited in claim 11, further comprising:
means for measuring a power level of an electromagnetic signal received within said defined signal band; and
means for identifying said electromagnetic signal as said interference signal if said power level is greater than said noise threshold value.

17. The apparatus as recited in claim 11, wherein at least a part of said interference signal is transmitted by a source external to said apparatus.

18. The apparatus as recited in claim 11, wherein said at least one programmable signal filter comprises a notch filter.

19. The apparatus as recited in claim 18, further comprising:
means for programming said notch filter to operate with a center frequency set to a frequency of said interference signal.

20. The apparatus as recited in claim 18, wherein said at least one signal comprises at least one SPS signal.

21. An apparatus comprising:
a receiver comprising:
an RF front-end circuit to receive electromagnetic signals within a defined signal band and generate at least one corresponding received signal; and
a back-end processor circuit coupled to said RF front-end circuit to:
perform a calibration, at least in part, by measuring a noise power level for at least a portion of said defined signal band and identifying a noise threshold value based, at least in part, on said noise power level;
perform a Fourier transform operation with said received signal;
identify at least one interference signal within said defined signal band based, at least in part, on one or more results from said Fourier transform operation and said noise threshold value;
selectively initiate operation of at least one programmable signal filter within said back-end processor circuit to mitigate at least a portion of said interference signal; and
selectively initiate operation of at least one other programmable signal filter within said back-end processor circuit to mitigate a predetermined interference signal, said predetermined interference signal being transmitted at least in part by at least one circuit within said apparatus.

22. The apparatus as recited in claim 21, said back-end processor circuit to monitor at least a portion of said received signal in response to a change in an operational mode of said receiver.

23. The apparatus as recited in claim 21, further comprising:
a wireless transceiver coupled to said receiver to interface with a wireless communication network; and said back-end processor circuit to monitor at least a portion of said received signal in response to a change in an operational mode of said wireless transceiver.

24. The apparatus as recited in claim 21, wherein said back-end processor circuit periodically performs said calibration.

25. The apparatus as recited in claim 21, wherein said back-end processor circuit selectively performs said calibration in response to one or more triggering events.

26. The apparatus as recited in claim 21, said back-end processor circuit to obtain a power level of an electromagnetic signal received within said defined signal band, and identify said electromagnetic signal as said interference signal if said power level is greater than said noise threshold value.

27. The apparatus as recited in claim 21, wherein said interference signal is transmitted by a source external to said electronic device.

28. The apparatus as recited in claim 21, wherein said at least one programmable signal filter comprises a notch filter.

29. The apparatus as recited in claim 28, wherein said notch filter is programmed to operate with a center frequency set to a frequency of said interference signal.

30. The apparatus as recited in claim 28, wherein said electromagnetic signals within said defined signal band comprise at least one SPS signal.

31. An article comprising:
a non transitory computer readable medium having computer implementable instructions stored thereon that in response to being executed by one or more processing units in an electronic device comprising a receiver enabled to perform a Fourier transform operation with a received signal, enable the electronic device to:
perform a calibration, at least in part, by measuring a noise power level for at least a portion of a defined signal band and identifying a noise threshold value based, at least in part, on said noise power level;
identify at least one interference signal within said defined signal band based, at least in part, on one or more results from said Fourier transform operation and said noise threshold value; and
selectively initiate operation of at least one programmable signal filter within said receiver to mitigate at least a portion of said interference signal; and
selectively initiate operation of at least one other programmable signal filter within said receiver to mitigate a predetermined interference signal, said predetermined interference signal being transmitted at least in part by at least one circuit within said electronic device.

32. The article as recited in claim 31, wherein the computer implementable instructions in response to being executed by the one or more processing units in the electronic device further enable the electronic device to:
monitor at least a portion of said defined signal band in response to a change in an operational mode of said receiver.

33. The article as recited in claim 31, wherein said electronic device further comprises a wireless transceiver, and wherein the computer implementable instructions in response to being executed by the one or more processing units in the electronic device further enable the electronic device to:
monitor at least a portion of said defined signal in response to a change in an operational mode of said wireless transceiver.

34. The article as recited in claim 31, wherein the computer implementable instructions in response to being executed by the one or more processing units in the electronic device further enable the electronic device to periodically perform said calibration.

35. The article as recited in claim 31, wherein the computer implementable instructions in response to being executed by the one or more processing units in the electronic device further enable the electronic device to selectively perform said calibration in response to one or more triggering events.

36. The article as recited in claim 31, wherein the computer implementable instructions in response to being executed by the one or more processing units in the electronic device further enable the electronic device to:
measure a power level of an electromagnetic signal received within said defined signal band; and
identify said electromagnetic signal as said interference signal if said power level is greater than said noise threshold value.

37. The article as recited in claim 31, wherein said interference signal is transmitted by a source external to said electronic device.

38. The article as recited in claim 31, wherein said at least one programmable signal filter comprises a notch filter.

39. The article as recited in claim 38, said notch filter to operate with a center frequency set to a frequency of said interference signal.

40. The article as recited in claim 31, wherein said received signal comprises at least one SPS signal.

41. The article as recited in claim 31, wherein said one or more processing units comprise a back-end processor within said receiver.

* * * * *